(12) United States Patent
Marcu et al.

(10) Patent No.: US 7,919,190 B2
(45) Date of Patent: Apr. 5, 2011

(54) POLYMER COMPOSITION

(75) Inventors: Ioan Marcu, Medina, OH (US);
Pravinchandra K. Shah, Westlake, OH (US); Scott T. Cornman, Avon, OH (US); Stephan A. Horvath, North Royalton, OH (US); Jerry D. Church, Tega Cay, SC (US); Donald L. Reeves, Gastonia, NC (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 776 days.

(21) Appl. No.: 11/718,897

(22) PCT Filed: Nov. 8, 2005

(86) PCT No.: PCT/US2005/040676
§ 371 (c)(1),
(2), (4) Date: May 9, 2007

(87) PCT Pub. No.: WO2006/055377
PCT Pub. Date: May 26, 2006

(65) Prior Publication Data
US 2008/0124560 A1    May 29, 2008

Related U.S. Application Data

(60) Provisional application No. 60/628,008, filed on Nov. 15, 2004.

(51) Int. Cl.
*B32B 27/00* (2006.01)
*B32B 5/02* (2006.01)

(52) U.S. Cl. ............... 428/461; 428/500; 428/537.1; 442/138; 442/141

(58) Field of Classification Search .............. 428/461, 428/500, 537.1
See application file for complete search history.

(56) References Cited

U.S. PATENT DOCUMENTS

| 3,349,054 | A |   | 10/1967 | Leitner et al. |
| 4,533,689 | A |   | 8/1985 | Tayama et al. |
| 4,769,275 | A | * | 9/1988 | Inagaki et al. ............ 442/136 |
| 5,741,854 | A |   | 4/1998 | Huang |
| 2006/0142439 | A1 | * | 6/2006 | Titelman et al. ............ 524/100 |

FOREIGN PATENT DOCUMENTS

| DE | 2005693 A1 | 8/1971 |
| EP | 1431353 A1 | 6/2004 |
| RU | 2177489 C2 | 12/2001 |
| RU | 2188218 C2 | 8/2002 |
| SU | 1381222 A1 | 3/1988 |
| WO | 01/05886 A1 | 1/2001 |

* cited by examiner

*Primary Examiner* — Lynda Salvatore
(74) *Attorney, Agent, or Firm* — Samuel B. Laferty

(57) ABSTRACT

The disclosed invention relates to a composition, comprising: (A) at least one halogen-free polymer, the polymer exhibiting a total loss of mass of at least about 7% by weight at a temperature of 370° C. when subjected to thermogravimetric analysis; (B) at least one acid source; (C) at least one carbon-yielding source; and (D) at least one blowing agent.

12 Claims, 2 Drawing Sheets

US 7,919,190 B2

POLYMER COMPOSITION

CROSS-REFERENCE TO RELATED APPLICATION

This application claims priority from PCT Application Serial No. PCT/US2005/40676 filed on Nov. 8, 2005 which claims the benefit of U.S. Provisional Application Ser. No. 60/628,008 filed on Nov. 15, 2004.

TECHNICAL FIELD

This invention relates to polymer compositions and, more particularly, to polymer compositions comprising halogen-free polymers. The polymer compositions may be characterized by enhanced fire retardant properties. The polymer compositions may be in the form of latex compositions.

BACKGROUND

Latex compositions have been widely used in providing decorative or protective coatings as well as in providing binders or saturants for woven and non-woven substrates and paper substrates. In order to provide latex compositions with flame retardant properties, it is common practice to incorporate halogen-containing monomers such as vinyl chloride into the latex resin. However, a problem with this practice is that when the resin burns, hydrochloric acid is released. This invention, in at least one embodiment, provides a solution to this problem.

SUMMARY

This invention relates to a composition, comprising: (A) at least one halogen-free polymer, the polymer exhibiting a total loss of mass of at least about 7% by weight at a temperature of 370° C. when subjected to thermogravimetric analysis; (B) at least one acid source; (C) at least one carbon-yielding source; and (D) at least one blowing agent. This composition, in at least one embodiment, exhibits enhanced fire retardant properties. These compositions may be in the form of latex compositions and may be used as binders, coatings, and the like.

DETAILED DESCRIPTION

Figure 1:
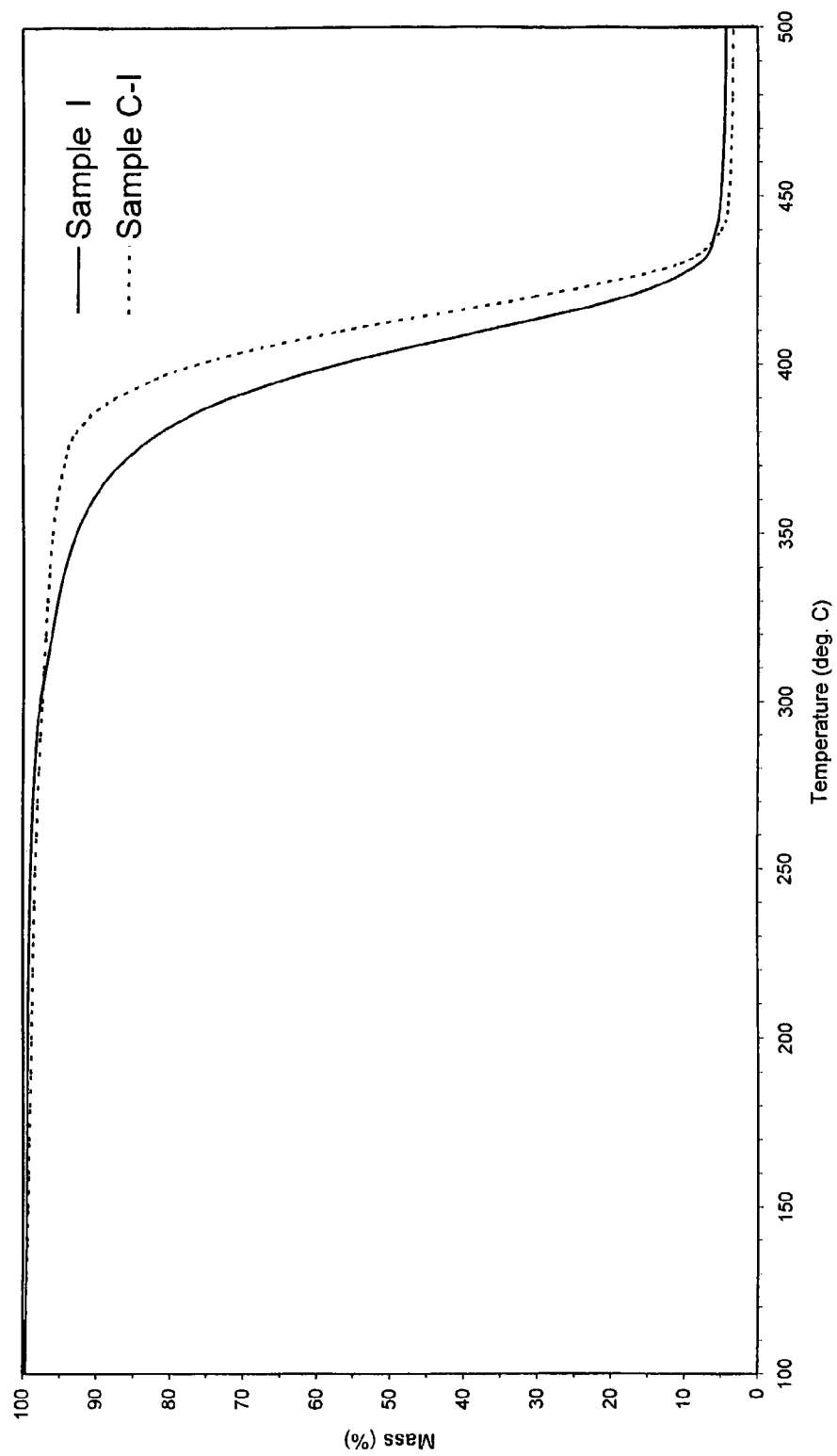
FIG. 1 is a plot of loss of mass versus temperature for the thermogravimetric tests disclosed in Example 3.

The term "polymer" is used herein to refer to the product of a polymerization reaction in which the molecules of one or more monomers are linked together to form large molecules whose molecular weight is a multiple of that of the one or more monomers. These polymers may be homopolymers or copolymers. These polymers may be linear polymers, branched polymers, crosslinked polymers, or a mixture of two or more thereof.

The term "homopolymer" is used herein to refer to a polymer resulting from the polymerization of a single monomer.

The term "copolymer" is used herein to refer to a polymer resulting from the polymerization of two or more chemically distinct monomers.

The term "linear polymer" refers to a polymer in which the molecules form long chains without branches or crosslinked structures.

The term "branched polymer" refers to a polymer in which the molecules form a main chain or polymer backbone and one or more additional relatively short chains are attached to the main chain or polymer backbone.

The term "crosslinked polymer" refers to a polymer in which the polymer molecules are linked to each other at points in their structures other than at the ends of the polymer chains.

The term "halogen-free" polymer refers to a polymer that does not have any halogen atoms attached to it. In one embodiment, the halogen-free polymer is a chlorine-free polymer. The term "halogen-free" does not exclude halogen that may be present at contaminate levels, for example, levels of up to about 5% by weight, and in one embodiment up to about 2% by weight, and in one embodiment up to about 1% by weight, and in one embodiment up to about 0.5% by weight, and in one embodiment up to about 0.2% by weight, and in one embodiment up to about 0.1% by weight.

The term "latex composition" refers to a dispersion of particulates of polymer in an aqueous medium.

The term "latex resin" refers to a polymer in a latex composition.

The term "Newtonian copolymer" refers to a copolymer that exhibits flow characterized by a rate of shear that is directly proportional to the shearing force.

The term "reticulated copolymer" refers to a copolymer in which the copolymer molecules are linked to each other at points in their structures other than at the ends of the copolymer chains. These copolymers may be in the form of three dimensional networks.

The halogen-free polymer (A) may be derived from one or more monomers other than halogen containing monomers. The polymer (A) may be a homopolymer or a copolymer. The polymer (A) may be in the form of a linear polymer, a branched polymer, a crosslinked polymer, or a mixture of two or more thereof. The polymer (A) may be a thermoplastic polymer. The polymer (A) may be a latex resin. In one embodiment, the polymer (A) is other than a blend of a Newtonian copolymer and a reticulated copolymer. The monomers that may be used to form the polymer (A) may comprise one or more acrylic esters, dienes, styrenes, vinyl esters, nitriles, olefins, and the like.

The halogen-containing monomers that are to be avoided include vinyl chloride and vinylidene chloride.

The alkyl acrylates that may be used to prepare the acrylic esters may comprise alkyl acrylates and alkyl methacrylates, that is, alkyl (meth) acrylates, containing from 1 to about 22 carbon atoms in the alkyl group, and in one embodiment from 1 to about 12 carbon atoms, and in one embodiment from 1 to about 8 carbon atoms, and in one embodiment from 1 to about 4 carbon atoms, and in one embodiment from 1 to about 3 carbon atoms, and in one embodiment from about 2 to about 8 carbon atoms in the alkyl group. These include methyl (meth) acrylate, ethyl (meth) acrylate, propyl (meth) acrylate, n-butyl (meth) acrylate, 2-ethylhexyl (meth) acrylate, and the like. The dienes may comprise dienes containing from 3 to about 6 carbon atoms. These include butadiene, isoprene, and the like. The styrenes include styrene and alkyl substituted styrenes such as methyl styrene, vinyl toluene, and the like. The vinyl esters include the vinyl esters of carboxylic acids containing from about 4 to about 22 carbon atoms, such as vinyl acetate, vinyl propionate, vinyl formate, vinyl stearate, vinyl benzoate, and the like. The nitriles include acrylonitrile, methacrylonitrile, as well as olefinically unsaturated nitriles containing from 3 to about 6 carbon atoms. The olefins include olefins containing from 2 to about 12 carbon atoms, and in one embodiment from 2 to about 6 carbon atoms, and in one embodiment from 2 to about 4 carbon atoms. These include ethylene, propylene, butylene, isobutylene, and the like. The olefins include alpha-olefins such as butene-1.

The polymer (A) may be a homopolymer derived from the foregoing acrylic esters, dienes, styrenes, vinyl esters, nitriles or olefins. The polymer (A) may be a copolymer derived from two or more of the foregoing monomers. The polymer (A) may be a copolymer derived from one or more of the foregoing monomers and/or one or more suitable comonomers. The suitable comonomers may comprise one or more olefinically unsaturated monocarboxylic acids containing 3 to about 5 carbon atoms, such as acrylic acid, methacrylic acid, ethacrylic acid, itaconic acid, cyanoacrylic acid, and the like; vinyl ethers containing 4 to about 22 carbon atoms, such as ethyl vinyl ether, isobutyl vinyl ether, cetyl vinyl ether, lauryl vinyl ether, and the like; vinyl ketones containing 3 to about 12 carbon atoms, such as methyl vinyl ketone, and the like; and acrylamides such as acrylamide, methacrylamide, methylene-bis-acrylamide, and the like. The polymer (A) may contain up to about 20% by weight, and in one embodiment from about 0.5 to about 20% by weight, and in one embodiment from about 0.5 to about 10% by weight, and in one embodiment from about 0.5 to about 5% by weight of one or more of these comonomers.

In one embodiment, one or more functional monomers may be used as comonomers in the preparation of the polymer (A). These include 2-hydroxy ethyl acrylate, 2-hydroxyethyl methacrylate, glycidyl acrylate, glycidyl methacrylate, N-methylol acrylamide, N-(n-butoxy methyl acrylamide), N-(iso-butoxy methyl)acrylamide, N-methylol methyl acrylamide, and the like. These monomers may undergo condensation reactions. In one embodiment, the condensation reaction may evolve formaldehyde. The polymer (A) may contain up to about 15% by weight, and in one embodiment from about 0.5 to about 15% by weight, and in one embodiment from about 0.5 to about 10% by weight, and in one embodiment from about 0.5 to about 5% by weight, and in one embodiment from about 0.5 to about 3% by weight of these monomers.

In one embodiment, the polymer (A) may comprise at least one copolymer derived from a mixture of monomers comprising (i) styrene, one or more alkyl substituted styrenes, or a mixture thereof, and (ii) at least one alkyl acrylate, wherein the weight ratio of (i) to (ii) may be in the range from about 0.05:1 to about 2:1, and in one embodiment from about 0.2:1 to about 0.8:1.

In one embodiment, the polymer (A) may comprise at least one copolymer derived from a mixture of monomers comprising styrene and n-butyl acrylate. The weight ratio of styrene to n-butyl acrylate may be in the range from about 0.05:1 to about 2:1, and in one embodiment from about 0.2:1 to about 0.8:1, and in one embodiment from about 0.3:1 to about 0.7:1, and in one embodiment from about 0.3:1 to about 0.5:1.

The foregoing monomers may be polymerized in an aqueous medium. In one embodiment, the product formed by this polymerization may comprise a latex composition, and the polymer (A) in the latex composition may comprise a latex resin. The aqueous medium may contain one or more emulsifiers. Alternatively, the aqueous medium may be free of emulsifiers. When emulsifiers are used, anionic, or amphoteric emulsifiers may be employed. The anionic emulsifiers may include alkali metal or ammonium salts of the sulfates of alcohols containing from about 8 to about 18 carbon atoms such as sodium lauryl sulfate, alkali metal and ammonium salts of sulfonated petroleum and paraffin oils, sodium salts of sulfonic acids, arylalkyl sulfonates, alkali metal and ammonium salts of sulfonated dicarboxylic acid esters, and the like. These may include alkali metal and ammonium salts of aromatic sulfonic acids, alkyl sulfonates, alkylaryl sulfonates, arylalkyl sulfonates, alkyl sulfates, and poly(oxyalkylene) sulfonates. Nonionic emulsifiers, such as $C_8$ to $C_{22}$ alkyl polyethoxylates, $C_8$ to $C_{22}$ alkyl phenol polyethoxylates, and the like, may be used. The emulsifier concentration may vary up to about 15 parts by weight per 100 parts by weight of the monomers, and in one embodiment from about 0.1 to about 15 parts by weight per 100 parts by weight of the monomers, and in one embodiment from about 0.1 to about 10 parts by weight per 100 parts by weight of the monomers, and in one embodiment from about 0.1 to about 5 parts by weight per 100 parts by weight of the monomers, and in one embodiment from about 0.5 to about 2 parts by weight per 100 parts by weight of the monomers. The emulsifier may be added before, during or after polymerization. The emulsifier may be added incrementally throughout the polymerization reaction.

The polymerization may be conducted at a temperature in the range from about 10° C. to about 100° C., and in one embodiment from about 60° C. to about 90° C. The polymerization may be conducted in the presence of one or more initiators. The initiators may include free radical initiators. These include peroxygen compounds such as persulfates, benzoyl peroxide, t-butyl hydroperoxide, and cumene hydroperoxide; and azo compounds such as azodiisobutyronitrile and dimethylazodiisobutyrate. The initiators may include water-soluble peroxygen compounds such as hydrogen peroxide and sodium, potassium or ammonium persulfates used by themselves or in an activated redox system. Typical redox systems may include alkali metal persulfates in combination with a reducing substance such as polyhydroxyphenols and oxidizable sulfur compounds, a reducing sugar, dimethylaminopropionitrile, a diazomercaptan compound, or a water-soluble ferrous sulfate compound. The initiator may comprise an alkali metal or ammonium persulfate initiator. The concentration of initiator may be in the range of from about 0.005 to 5% by weight based on the weight of the monomers, and in one embodiment from about 0.01 to about 2% by weight, and in one embodiment from about 0.1 to about 0.8% by weight. The initiator may be added at the outset of the polymerization reaction or incremental additions of the initiator throughout polymerization reaction may be employed.

Polymerization of the monomers described above to form the polymer (A) may be conducted in an aqueous medium by charging a polymerization reactor with an appropriate amount of water, optionally one or more emulsifiers, and a sufficient amount of initiator to initiate polymerization. The polymerization reactor may be heated to the initiation temperature. An emulsified monomer premix may be added over a desired period of time, for example, several hours. The monomer premix may be prepared by mixing water, optionally one or more emulsifiers, one or more monomers, and optionally one or more polymerization modifiers. The rate of addition may be varied depending on the polymerization temperature, the particular initiator employed and the amount of monomer being polymerized. After the monomer premix has been added to the polymerization reactor, additional initiator may be added. The polymerization reactor may be heated and the reactor contents may be agitated for a desired period of time, for example, up to several hours, to achieve the desired conversion. Resulting coagulum, if any, may be separated from the polymer dispersion using filtration. The polymer dispersion may be referred to as a latex composition.

The latex composition may have a total solids content of up to about 80% by weight, and in one embodiment from about 20% to about 80% by weight, and in one embodiment from about 25% to about 75% by weight, and in one embodiment from about 40% to 60% by weight. The particle size of the particulate solids may be in the range from about 50 to about 1000 nanometers (nm), and in one embodiment from about 100 to about 300 nm. The pH of the latex composition may be in the range from about 1.2 to about 12, and in one embodiment from about 3 to about 7.

The latex composition may contain, in addition to the polymer (A), one or more emulsifiers, curing agents, fillers, plasticizers, antioxidants or stabilizers, antifoaming agents, dying adjuvants, pigments, as well as other known latex or paint additives. Thickeners or bodying agents may be added to the latex compositions to control the viscosity and thereby achieve the proper flow properties for the particular application desired. Each of these may be added at a concentration of up to about 15% by weight based on the weight of the solids in the latex composition.

In one embodiment, the polymer (A) may have a glass transition temperature (Tg) in the range from about −40° C. to about 40° C., and in one embodiment from about −20° C. to about 10° C. In one embodiment, the polymer may not have a specifically defined glass transition temperature.

In order for the inventive compositions to exhibit effective fire retardant properties, it is desirable for the polymer to exhibit certain thermal stability characteristics. These characteristics may relate to the loss of mass the polymer undergoes when it is burned. This loss of mass can be measured using thermogravimetric analysis (TGA). With TGA, a sensitive balance is used to follow the weight of a sample as a function of temperature. The polymer (A) may exhibit a total loss of mass of at least about 5% by weight, and in one embodiment from about 5% to about 30% by weight, and in one embodiment from about 5% to about 60% by weight, at a temperature of 350° C. when subjected to TGA. In one embodiment, the polymer (A) may exhibit a total loss of mass of at least about 6% by weight, and in one embodiment from about 6% by weight to about 35% by weight, and in one embodiment from about 6% by weight to about 70% by weight, at a temperature of 360° C. when subjected to TGA. In one embodiment, the polymer (A) may exhibit a total loss of mass of at least about 7% by weight, and in one embodiment from about 7% by weight to about 40% by weight, and in one embodiment from about 7% to about 80% by weight, at a temperature of 370° C. when subjected to TGA. In one embodiment, the polymer (A) may exhibit a total loss of mass of at least about 14% by weight, and in one embodiment from about 14% by weight to about 60% by weight, and in one embodiment from about 14% by weight to about 90% by weight, at a temperature of 390° C. when subjected to TGA. In one embodiment, the polymer (A) may exhibit a total loss of mass of at least about 25% by weight, and in one embodiment from about 25% by weight to about 60% by weight, and in one embodiment from about 25% by weight to about 90% by weight, at a temperature of 400° C. when subjected to TGA. In one embodiment, the polymer (A) may exhibit a total loss of mass of at least about 44% by weight, and in one embodiment from about 44% by weight to about 80% by weight, and in one embodiment from about 44% by weight to about 95% by weight, at a temperature of 410° C. when subjected to TGA. These characteristics may contribute to the formation of a stable char when the inventive compositions are burned.

The following Example 1 discloses the preparation of a copolymer corresponding to the polymer (A) that is within the scope of the invention, and the following Example C-1 discloses a copolymer that is not within the scope of the invention but is provided for purposes of comparison.

Example 1

A monomer premix is prepared formed by adding water (270 g), 30% sodium lauryl sulfate solution (30 g) and a mixture of monomers (180 styrene, 418.2 g n-butyl acrylate, 3.6 g methylene-bis-acrylamide) to a premix vessel. The contents of the premix vessel are agitated. Water (324 g) and 30% sodium lauryl sulfate solution (1.1 g) are added to a polymerization reactor. Agitation in the polymerization reactor is commenced under a nitrogen purge. The temperature of the polymerization reactor is increased to the initiation temperature of 80° C. An initiator (3 g sodium persulfate) is added to the polymerization reactor. The monomer premix is added to the polymerization reactor at a rate of 4.3 g/min. An additional amount of initiator (0.18 g sodium persulfate in 50 g of water) is metered in over a period of 150 minutes. The reaction mixture is maintained in the polymerization reactor with agitation and at a temperature of 87° C. for 285 minutes to allow the reaction to proceed. An additional amount of redox initiator may be added to complete the polymerization of the monomers and the reaction mixture may be maintained in the polymerization reactor with agitation for an additional period of time. The polymerization reactor is cooled, and the polymerization reactor contents are filtered and poured into a storage container.

Example C-1

A monomer premix is formed by adding water (100 g), 30% sodium lauryl sulfate solution (6 g), itaconic acid (12 g), 48% N-methyol acrylamide (25 g), styrene (306 g), n-butyl acrylate (264 g) and acrylic acid (6 g) to a premix vessel. The contents of the premix vessel are agitated. Water (200 g) is added to a polymerization reactor. Agitation in the polymerization reactor is commenced under a nitrogen purge. The temperature of the polymerization reactor is increased to the initiation temperature of 87° C. An initiator (2.4 g sodium persulfate) is added to the polymerization reactor. The monomer premix is added to the polymerization reactor at a rate of 4.3 g/min. An additional amount of initiator (0.24 g sodium persulfate in 53 g of water) is added. The reaction mixture is maintained in the polymerization reactor with agitation and at a temperature of 87° C. for 210 minutes to allow the reaction to proceed. An additional amount of initiator (0.18 g sodium persulfate in 50 g of water) is added and the reaction mixture is agitated for an additional 75 minutes. The polymerization reactor is cooled and the polymerization reactor contents are filtered and poured into a storage container.

TGA for the polymers produced in Examples 1 and C-1 is determined using the following procedure. The samples for thermogravimetric analysis are tested on a TA instruments Model 2950HR (high resolution) Thermogravimetric Analyzer. Approximately 10 to 20 mg of each sample are weighed into a tarred aluminum TGA pan. The temperature is increased at a rate of 10° C. per minute to a maximum temperature of 550° C. The samples are heated in a nitrogen atmosphere. Data is recorded using Thermal Advantage Software and analyzed with Universal Analysis 2000 software. The test is run in accordance with ASTM E1131-98. The TGA results for these polymers are shown in FIG. 1 and are reproduced below in Table 1. In Table 1, the numerical values are for the loss of mass in weight percent at the indicated temperature.

TABLE 1

| Temperature | Example 1 | Example C-1 |
|---|---|---|
| 320 | 4% | 3% |
| 330 | 5% | 3% |
| 340 | 6% | 4% |
| 350 | 7% | 4% |
| 360 | 9% | 5% |
| 370 | 13% | 6% |
| 380 | 19% | 7% |
| 390 | 28% | 13% |
| 400 | 43% | 24% |
| 410 | 63% | 43% |
| 420 | 82% | 70% |
| 430 | 92% | 90% |
| 440 | 94% | 95% |

The latex composition comprising the polymer (A) may be combined with (B) at least one acid source, (C) at least one carbon-yielding source, and (D) at least one blowing agent to form a fire retardant composition. Components (B), (C) and (D) may be mixed with each other prior to mixing with the latex composition. The mixture of components (B), (C) and (D) may be referred to as an intumescent composition. The intumescent composition may be mixed with the latex composition at a sufficient weight ratio to provide enhanced fire retardant characteristics to the resulting latex composition as well as to substrates to which the resulting latex composition may be applied. The composition may be mixed using any mixing technique suitable for mixing aqueous dispersions. The weight ratio, on a solids to solids basis, of the polymer (A) to the intumescent composition (that is, the combination of components (B), (C) and (D)) may be in the range from about 1:25 to about 25:1, and in one embodiment from about 1:20 to about 4:1, and in one embodiment from about 1:20 to about 3:1, and in one embodiment from about 1:20 to about 2:1, and in one embodiment from about 1:10 to about 3:2.

The acid source (B) may comprise any material, for example an inorganic acid, that yields an acid at a temperature in the range from about 175° C. to about 300° C., and in one embodiment from about 200° C. to about 250° C. The acid source may comprise an ammonium polyphosphate having repeating units represented by the formula $(PO_3^-.NH_4^+)_x$, wherein x is a number in the range from 1 to about 3500, and in one embodiment from about 150 to about 2500, and in one embodiment from about 600 to about 1200. The acid source may comprise melamine (poly) phosphate. The acid source may comprise one or more of monoammonium orthophosphate, diammonium orthophosphate, condensed phosphoric acid, orthophosphoric acid, and the like. These may be thermally condensed with an ammoniating and condensing agent such as urea; ammonium carbonate; biuret; sulfamide; sulfamic acid; ammonium sulfamate; guanyl urea; methyl ureaformamide; amino urea; 1,3-diamino urea; biurea; and the like. For example, monoammonium orthophosphate and urea may be thermally condensed to prepare a substantially water-insoluble ammonium polyphosphate by heat treating a melt formed from substantially equimolar quantities at a temperature of about 250° C. for a period of about 3 hours. The acid source may be employed in the intumescent composition (that is, the combination of (B), (C) and (D)) at a concentration in the range from about 2% to about 90% by weight, and in one embodiment from about 5% to about 90% by weight, and in one embodiment from about 10% to about 90% by weight, and in one embodiment from about 20% to about 85% by weight, and in one embodiment from about 40% to about 80% by weight based on the total weight of solids in the intumescent composition.

The carbon-yielding source (C) may comprise pentaerythritol, dipentaerythritol, tripentaerythritol, carbohydrated modified sugars, carbohydrated modified starches, water-dispersible proteins, gelatins, casein, derivatives of any of the foregoing, and mixtures of two or more thereof. The carbon-yielding source may be referred to as a carbonific source or a char-yielding source. The carbon-yielding source may be employed in the intumescent composition at a concentration from about 1% to about 60% by weight, and in one embodiment from about 5% to about 60% by weight, and in one embodiment from about 10% to about 40% by weight based on the total solids in the intumescent composition.

The blowing agent (D) may comprise any material that generates an inert gas upon being heated at a temperature in the range from about 100° C. to about 500° C., and in one embodiment from about 150° C. to about 500° C., and in one embodiment from about 230° C. to about 400° C. The blowing agent may comprise an organic amine or amide. The blowing agent may comprise melamine, melamine salts, urea, dicyandiamide, or a mixture of two or more thereof. The blowing agent may be used at a concentration from about 1% to about 60% by weight, and in one embodiment from about 5% to about 60% by weight, and in one embodiment from about 10% to about 40% by weight based on the weight of total solids in the intumescent composition.

In one embodiment, the softening temperature range of the polymer (A) may be synchronized with the temperature in which the intumescent composition (i.e., the combination of components (B), (C) and (D)), decomposes, liberates non-combustible gases and foams, so that the polymer (A) in combination with the intumescent composition may form a matrix for trapping non-combustible gases and an intumescent layer for providing a barrier against fire and heat.

The following Example 2 discloses an intumescent composition within the scope of the invention.

Example 2

An intumescent composition is prepared from the following formulation. This composition has a solids content of 71% by weight.

| | Parts by Wt. |
|---|---|
| Water | 28 |
| Igepal CO-530 (non-ionic surfactant supplied by Rhoda identified as nonyl phenol ethoxylate) | 0.1 |
| Melamine | 14.1 |
| Pentaerythritol | 14.1 |
| Carbopol EP-1 (thickener supplied by Noveon identified as a cross linked copolymer of ethyl acrylate and methacrylic acid dispersed in water and having a 30% by weight solids content) | 1.1 |
| Ammonia (28% by weight aqueous solution) | 0.1 |
| FR Cross 84 (ammonium polyphosphate supplied by Budenheim) | 42.4 |

The following Example 3 discloses the mixing of the polymers from Examples 1 and C-1 with the intumescent compositions from Example 2 to form latex Samples I and C-I.

Example 3

The intumescent composition from Example 2 is blended at a solids to solids weight ratio of 1:1 with the composition from Examples 1 and C-1 to make latex Samples I and C-I. Each of the Samples I and C-I has a solids content of 45% by weight. For each of the Samples I and C-I, the intumescent composition from Example 3 is added while the samples are agitated. Sodium lauryl sulfate (1% by weight) is added as a surfactant to stabilize the resulting mixture. Water is added to each of the mixtures to provide a solids content for each mixture of 50% by weight.

The inventive latex composition, which comprises water and components (A), (B), (C) and (D), may be useful as binders, coatings, and the like. This composition may be characterized by enhanced flame retardant properties. The solids concentration of the latex composition may be in the range from about 20% to 80% by weight, and in one embodiment from about 25% to 75% by weight. The latex composition may be applied to any substrate using any technique including brushing, spraying, dipping, rolling, roll-transfer, foam coating, film coating, and the like. The substrate may comprise wood, plastic, metal, drywall, masonry, webs or mats of woven fibers, webs or mats of non-woven fibers, and the like. Application of the latex composition to the substrate may be made at any temperature that is consistent with the end-use application. In one embodiment, the latex composition may be applied to the substrate at room temperature.

In one embodiment, the inventive latex compositions may be used as binders for webs or mats of woven fibers, webs or mats of non-woven fibers, and the like. The fibers may be partially or completely oriented or they may be randomly distributed. The web or mat may be formed by carding when the fibers are of such a character, by virtue of length and flexability, as to be amenable to a carding operation. The fibers may comprise natural textile fibers such as cellulose, jute, sisal, ramie, hemp and cotton, as well as many of the synthetic organic textile fibers including rayon, those of cellulose esters such as cellulose acetate, vinyl resin fibers such as those of polyvinyl chloride and copolymers thereof, polyacrylonitrile and copolymers thereof, polyesters such as poly(ethylene terephthalate), polymers and copolymers of olefins such as ethylene and propylene, condensation polymers such as polyimides or nylon types, and the like. The fibers that may be used can be those of a single composition or mixtures of fibers in a given web. The inventive latex composition may be combined with cellulosic materials or blends of cellulosic materials. These include paper made from cellulosic fibers; nonwoven fabric made by bonding natural fibers, synthetic fibers, or a mixture of such natural and synthetic fibers; and woven fabrics. With paper substrates, the latex composition may contribute to the strength of the paper. With paper cloth products having a non-woven, randomly-oriented structure, the latex composition may serve as a binder to hold the structure together and provide strength. Examples of paper cloth products include high-strength, high absorbent materials such as disposable items, e.g., consumer and industrial wipes or towels, diapers, surgical packs and gowns, industrial work clothing and feminine hygiene products. The inventive latex composition may be used as a binder for durable products, such as carpet and rug backings, apparel interlinings, automotive components and home furnishings, and for civil engineering materials, such as road underlays. Non-woven substrates may be formed from fiberglass, polyester, rayon, carbon, and the like fibers. These non-woven substrates may be made by wet-laid processes or dry or air-laid processes. In each case, the latex composition may serve to bind the fibers together.

The proportion of the latex composition that may be applied to the fibers may be sufficient to provide from about 0.1% to about 200% by weight, and in one embodiment from about 3% to about 50% by weight of the polymer (A), based on the total weight of the polymer (A) and the fibers. After application of the latex composition to the substrate, the resulting coated, impregnated or saturated substrate may be dried either at room temperature or at an elevated temperature. The substrate may be subjected, either after completion of the drying or as the final step of the drying step, to a baking or curing step. In one embodiment, the baking or curing steps may be conducted at a temperature in the range from about 110° C. to about 170° C. for a period of about 0.5 to about 10 minutes.

When a web or mat of fibers to which the inventive latex composition has been applied is exposed to heat or fire, in at least one embodiment of the invention, the flame spread during the early stages of the resulting fire is reduced and a char forms during the latter stages of the fire. This provides the latex composition and the web or mat to which the latex composition has been applied with enhanced fire retardant characteristics.

The inventive latex composition may be useful as a protective and/or decorative coating composition and when applied to a substrate may provide the substrate with flame retardant properties. These coating compositions may be applied to a substrate using any technique, for example, spraying, brushing, rolling, dipping, flowing, and the like. The substrate may be any substrate requiring coating with a flame retardant coating composition. These include substrates made of wood, plastic, metal, drywall, masonry, and the like. The inventive latex composition may be applied to the substrate at a coat weight in the range from about 0.1 to about 1000 grams per square meter, and in one embodiment from about 1 to about 200 grams per square meter. The coating of the inventive latex composition provides the substrate, in at least one embodiment, with a protective carbonaceous char layer exhibiting enhanced fire-retardant properties when the coating is exposed to heat and/or fire.

The following Example 4 discloses test results showing improved fire retardant properties for latex Sample I as compared to latex Sample C-I.

Example 4

Figure 2:
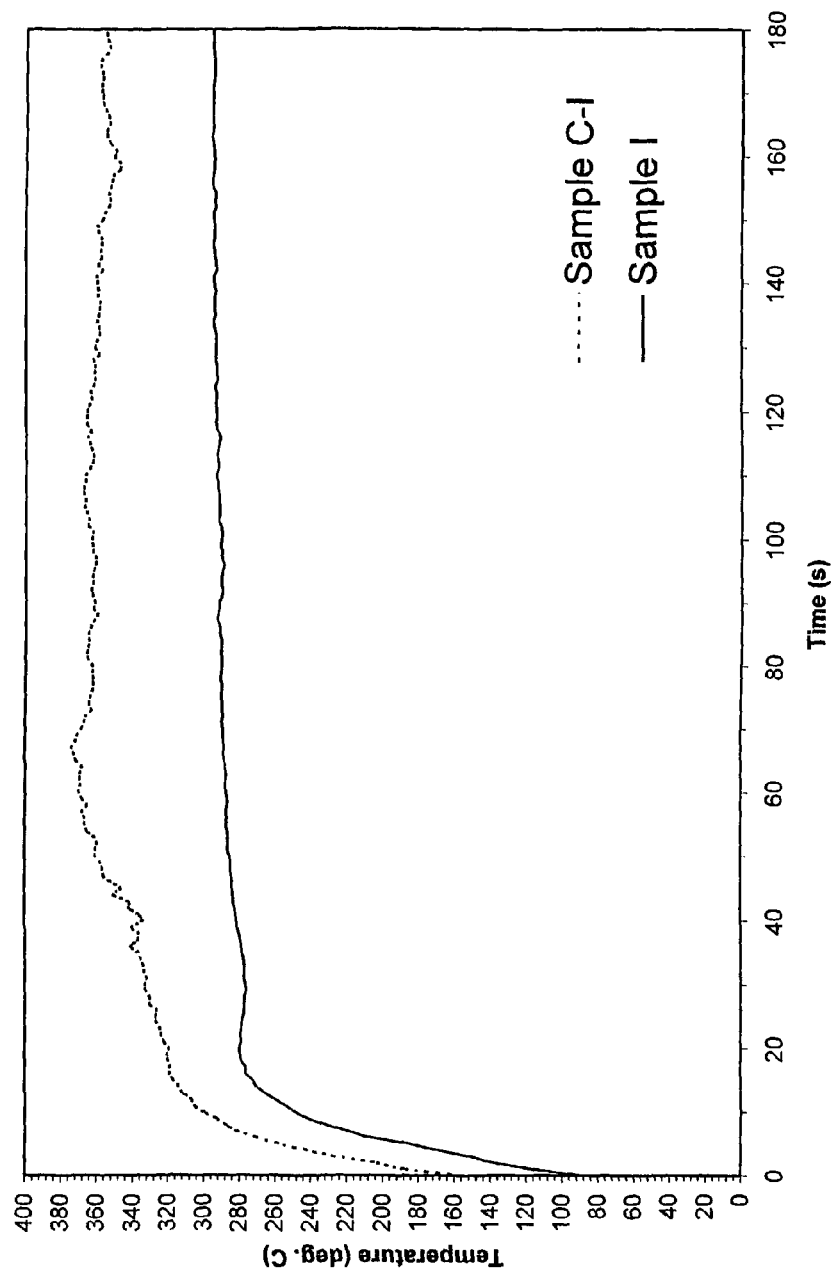
FIG. 2 is a plot of temperature versus time for the tests reported in Example 6.

Each of the latex Samples I and C-I from Example 3 is cast in the form of a film having a thickness of 25 mils on a Mylar sheet, dried overnight at room temperature, and placed in an oven operated at a temperature of 50° C. for one hour. The films are removed from the oven, placed on dry ice for 10 minutes and then peeled off the Mylar sheets. Each film is pressed on a 100% cotton sheet at a temperature of 50° C. and a pressure of 100 pounds per square inch (psi) for 2 minutes. The resulting fabric samples are cured for 3 minutes at 300° F. (148.9° C.), cut into squares (3×3 inch), and placed on a holder one inch above a ceramic radiant heater having a surface temperature of 650° C. The film side of each fabric sample faces the radiant heater. The temperature of the non-film side of each fabric sample is measured using an IR gun over a period of 180 seconds. The results for each sample are plotted in FIG. 2. These results show fabric temperatures that are about 90° C. less with Sample I as compared to Sample C-I.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An intumescent composition, comprising:
   (A) at least one halogen-free polymer, the polymer exhibiting a glass transition temperature (Tg) of from −20 to 10° C. and a total loss of mass of at least about 7% by weight at a temperature of 370° C. when subjected to thermogravimetric analysis and which comprises at least one copolymer derived from a mixture of monomers comprising i) styrene and ii) alkyl acrylate the weight ratio of i) to ii) being in the range from 0.05:1 to 2:1;
   (B) at least one acid source selected from ammonium polyphosphate, mono-ammonium orthophosphate, diammonium orthophosphate, condensed phosphoric acid, orthophosphoric acid, or a mixture of two or more thereof;
   (C) at least one carbon-yielding source selected from i) pentaerythritol, dipentaerythritol, tripentaerythritol, or a mixture of two or more thereof, or ii) carbohydrate modified sugar, carbohydrate modified starch, water-dispersible protein, gelatin, casein, or a mixture of two or more thereof; and
   (D) at least one blowing agent selected from melamine, melamine salt, urea, dicyandiamide, or a mixture of two or more thereof, said intumescent composition characterized by its ability to form a protective carbonaceous char layer exhibiting enhanced fire retardant properties when said intumescent composition is exposed to fire.

2. The composition of claim 1 wherein the polymer (A) exhibits a total loss of mass of at least about 14% by weight at a temperature of 390° C. when subjected to thermogravimetric analysis.

3. The composition of claim 1 wherein the polymer (A) exhibits a total loss of mass of at least about 25% by weight at a temperature of 400° C. when subjected to thermogravimetric analysis.

4. The composition of claim 1 wherein the polymer (A) exhibits a total loss of mass of at least about 44% by weight at a temperature of 410° C. when subjected to thermogravimetric analysis.

5. The composition of claim 1 wherein the polymer (A) comprises at least one copolymer derived from a mixture of monomers comprising styrene and n-butyl acrylate, the weight ratio of styrene to n-butyl acrylate being in the range from about 0.05:1 to about 2:1.

6. The composition of claim 1 wherein the acid source (B) comprises monoammonium orthophosphate, diammonium orthophosphate, condensed phosphoric acid, orthophosphoric acid, or a mixture of two or more thereof, which is thermally condensed with an agent comprising urea, ammonium carbonate, biuret, sulfamide, sulfamic acid, ammonium sulfamate, guanyl urea, methyl urea formamide, amino urea, 1,3-diamino urea, biurea, or a mixture of two or more thereof.

7. The composition of claim 1 wherein (B), (C) and (D) comprise an intumescent composition, the acid source (B) comprising from about 2% to about 90% by weight of the intumescent composition based on the total weight of solids in the intumescent composition, the carbon-yielding source (C) comprising from about 1% to about 60% by weight of the intumescent composition based on the total weight of solids in the intumescent composition, and the blowing agent (D) comprising from about 1% to about 60% by weight of the intumescent composition based on the total weight of solids in the intumescent composition.

8. The composition of claim 1 wherein (B), (C) and (D) comprise an intumescent composition, the weight ratio of the polymer (A) to the intumescent composition on a solids-to-solids basis being in the range from about 1:25 to about 25:1.

9. An intumescent composition, comprising:
   (A) at least one halogen-free copolymer derived from styrene and n-butylacrylate, the polymer exhibiting a glass transition temperature (Tg) of from −20 to 10° C. and a total loss of mass of at least about 7% by weight at a temperature of 370° C. when subjected to thermogravimetric analysis, the polymer (A) being other than a blend of a Newtonian copolymer and a reticulated copolymer;
   (B) ammonium polyphosphate;
   (C) pentaerythritol; and
   (D) melamine, said intumescent composition characterized by its ability to form a protective carbonaceous char layer exhibiting enhanced fire retardant properties when said intumescent composition is exposed to fire.

10. A substrate comprising a web or mat of fibers and the composition of claim 1.

11. A coated substrate comprising a substrate and a layer of the composition of claim 1 coated on the substrate.

12. A substrate comprising wood, metal, plastic, drywall, masonry, woven fibers, non-woven fibers, or a combination of two or more thereof, and the composition of claim 1 applied to the substrate.

* * * * *